Nov. 16, 1965   S. A. O. WIRFELT   3,217,384
MILLING CUTTER
Filed Aug. 29, 1962   2 Sheets-Sheet 1

INVENTOR
Sven Axel Olof Wirfelt
BY
Curtis, Morris & Safford
ATTORNEYS

Nov. 16, 1965   S. A. O. WIRFELT   3,217,384
MILLING CUTTER
Filed Aug. 29, 1962   2 Sheets-Sheet 2

INVENTOR.
Sven Axel Olof Wirfelt
BY
*Curtis, Morris & Safford*
ATTORNEYS

United States Patent Office 3,217,384
Patented Nov. 16, 1965

3,217,384
MILLING CUTTER
Sven Axel Olof Wirfelt, Sandviken, Sweden, assignor to Sandvikens Jernverks Aktiebolag, Sandviken, Sweden, a corporation of Sweden
Filed Aug. 29, 1962, Ser. No. 220,257
Claims priority, application Sweden, Feb. 26, 1962, 2,065/62
5 Claims. (Cl. 29—105)

This invention relates to milling cutters, and more in particular to the positioning and holding of disposable cutter inserts in the cutter body of a milling cutter.

Milling cutters have been provided with disposable cutter elements or cutter inserts. However, difficulties have been encountered with such constructions, particularly in insuring the proper positioning of the cutter inserts in the cutter body, and in mounting the inserts to prevent damage and breakage during normal use. It is an object of the present invention to provide an improved milling cutter construction which is free of the difficulties which have been encountered with such devices in the past. It is a further object to provide improved positioning and mounting means for cutter inserts. It is a further object to provide for the accurate positioning of disposable cutter inserts in milling cutters and the like. It is a further object to provide milling cutter constructions wherein the cutter elements are disposable, and may be positioned manually with great accuracy. It is a further object to provide structures of the above character wherein the time-consuming adjustment operation is performed only during the "set-up" period, and thereafter the cutter inserts may be indexed and replaced without altering the adjustment or losing the accuracy of the positioning of the effective cutting edges. It is a further object to provide the above with structure wherein the presence of foreign matter or dirt will not interfere with the accurate positioning and adjustment of the cutter inserts. These and other objects will be in part obvious and in part pointed out below.

In each of the illustrative embodiments of the present invention, the milling cutter has disposable tungsten carbide cutter inserts which are removably mounted in the cutter body, each insert having a plurality of sharp cutting edges. These cutter inserts are mounted upon anvil blocks or seats in the cutter body and are clamped in place by wedges. The wedges may be removed individually so that each of the cutter inserts may be indexed from one cutting edge to another. The cutter inserts may be of a type having a set of cutting edges at both side faces, in which case the cutter inserts are turned over when the cutting edges at one side face are no longer sharp. During assembly each cutter insert is positioned between two walls with two of its edge surfaces against three spaced supports, and it is then clamped by two walls which are co-extensive with its side faces. Two of these spaced supports are in alignment so as to present supporting surfaces in a predetermined plane. The third support is substantially at right angles to the other two so as to exert a supporting force which is substantially parallel to the said plane. Hence, an insert pressed with two of its edge surfaces against these three supports is positioned accurately with respect thereto, and it is clamped tightly in that position. Milling cutters incorporating the present invention achieve high accuracy with respect to surface smoothness of the work piece. The construction as described above overcomes difficulties which have been encountered with prior construction.

Referring to the drawings:
FIGURE 1 is a perspective of one embodiment of the invention;

Figure 1:
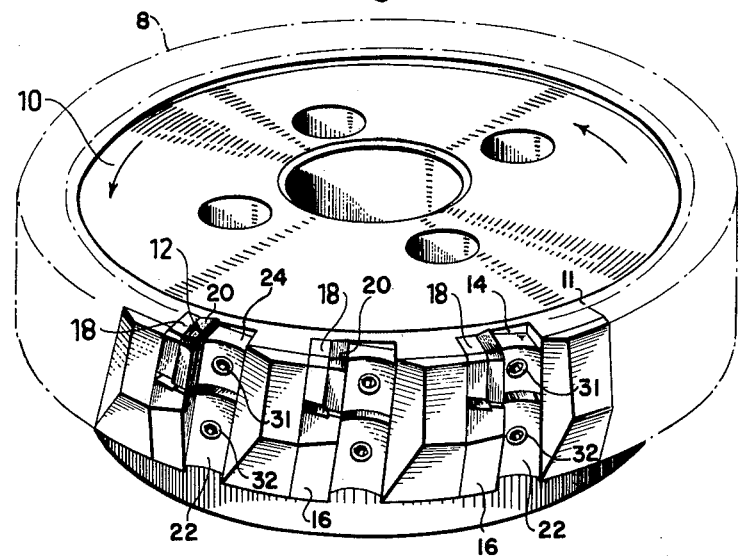
Figure 2:
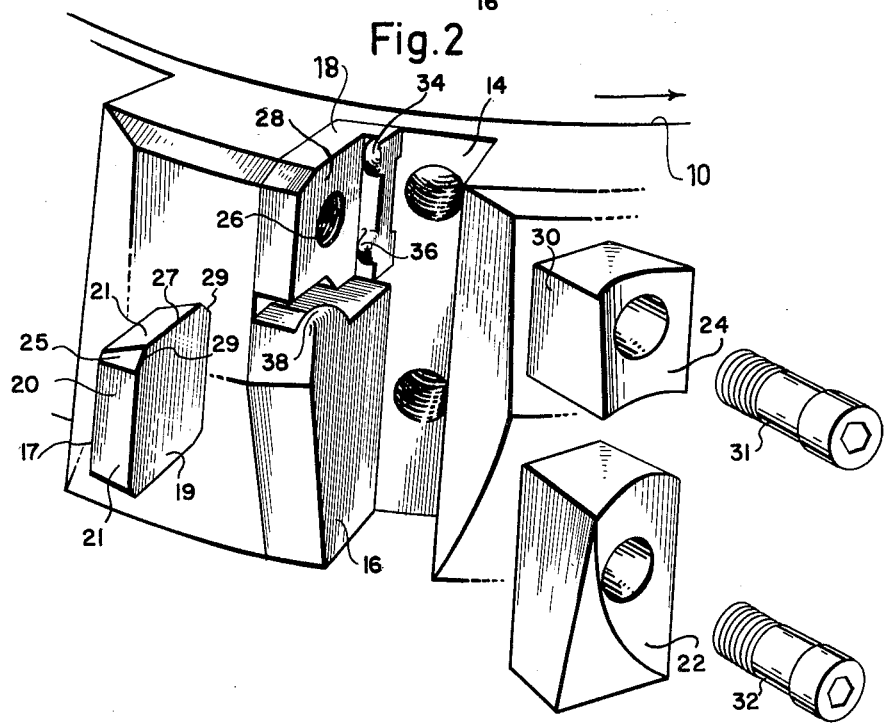
FIGURE 2 is an enlarged and exploded view of one cutting unit of FIGURE 1.
Figure 4:
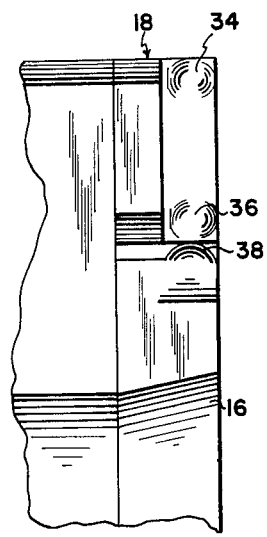
FIGURE 4 is a fragmentary view from the left hand side of FIGURE 3.

Referring to FIGURE 1 of the drawings, a milling cutter 8 has a cutter body 10 which is adapted to be mounted upon a mandrel or the spindle of a milling machine. During use, the milling cutter is rotated with its axis transverse to the surface being milled, and the milling cutter is moved across that surface with the annular face 11 of the cutter body (the top face in FIGURE 1) parallel to that surface. Evenly spaced around the periphery of the cutter body is a plurality of cutter assemblies 12, one of which is shown in FIGURE 2. The cutter body has a slot or groove 14 in which is positioned an adjustable block 16, anvil seat 18, a tungsten carbide cutter insert 20, and two wedge blocks 22 and 24. Cutter insert 20 has parallel side faces 17 and 19 which are regular polygons, and in this embodiment are square. The four edge surfaces 21 are at the same acute angle to face 19 and each forms a cutting edge 27. At each intersection of two cutting edges 27 there is a chamfer or beveled surface 25 which forms a chamfered cutting edge 29.

Figure 3:
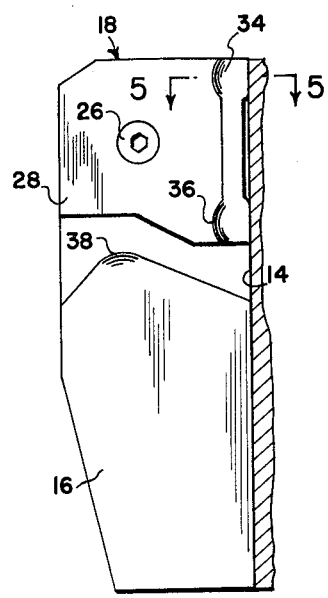
FIGURE 3 is an enlarged fragmentary sectional view on a radial plane of the milling cutter of FIGURE 1, showing the relationship between a cutter insert and its supports.
Figure 5:
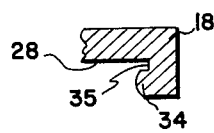
FIGURE 5 is a sectional view on the line 5—5 of FIGURE 3.

Anvil seat 18 is clamped in place by a screw 26 (see also FIGURE 3), and insert 20 is clamped against the face 28 of anvil seat 18 by wedge 24 acting through its face 30 and secured in place by a screw 31. Adjustment block 16 is clamped in place by wedge block 22, which is held in place by a screw 32. All of the cutter inserts 20 are identical and each cutter insert is symmetrical in the sense that its respective dimensions are identical. That is, each of the cutting edges 27 with its adjacent chamfer edges 29 is identical with every other cutting edge and it has a predetermined exact position on the cutter body.

Anvil seat 18 has a pair of lugs 34 and 36, and adjustable block 16 has a similar lug 38. These three lugs present positioning and supporting surfaces to two of the edge surfaces 21 of insert 20 so as to insure accurate positioning of the insert during the tightening of screw 31, which holds wedge block 24 in place. The lugs are rounded so that the surface of each of them which contacts the insert surface 21 approaches a supporting point. These supporting surfaces or zones on lugs 34 and 36 are along a line or plane which is transverse to the annular face 11. Hence, when the cutter insert is clamped against surface 28 by wedge 24 with one of its edge surfaces 21 in contact with lugs 34 and 36, the cutting edges 27 of the next adjacent edge surfaces 21 are exactly positioned relative to the surface 11, and the other cutting edges 27 are transverse to surface 11.

Each of the blocks 16 is accurately positioned during the "set-up" of the milling cutter in such a way that its cutter insert 20 is positioned as shown in FIGURE 1 when the edge surface 21 is resting upon lug 38. Block 16 is then securely clamped in place by wedge 22, and the surface of lug 38 which contacts the insert is positioned very accurately with respect to surface 11. Hence, the opposite cutting edge 27, which may be parallel to surface 11, projects the desired distance above that surface. Thus, it is seen that the cutter insert is positioned and clamped between the opposed faces of anvil block 28 and wedge block 24 and the "three-point" contact between the edge surfaces of the insert and the supporting lugs insures the accurate position of the protruding cutter edge 27. Lugs 34 and 36 also position the cutter insert radially with respect to the rotating axis of the cutter body so that the cutting edge 27 which protrudes beyond the cutter body and the chamfer cutting edges 29 are accurately positioned. Hence, as the milling cutter advances along the surface being milled, each of the cutter inserts operates at the exact same radius and performs the same cutting operation.

The utilization of one set of supports, lugs 34 and 36, to establish a positioning line for the cutter insert and a third support, lug 38, to provide a position point has proven very important in insuring the efficient and dependable positioning of the inserts. That is, the insert is positioned so that one of its cutting edges 27 is held by the surfaces of lugs 34 and 36 in the desired position relative to the axis of rotation and to the outer periphery of the cutter body; and, the third lug acts as a "stop" transverse to the edge surface 21 contacting lugs 34 and 36. The size and shape of anvil seat 18 is such that surface 28 is co-extensive with side face 17 except within the zones of the supporting lugs 34, 36 and 38. In this way, the cutter insert is supported throughout the area of the effective cutting edges and the adjacent chamfers, and the anvil seat does not project beyond the edges of the adjacent surface of the cutter insert. The cutter body is shaped in a similar way so that the entire assembly presents continuous smooth surfaces in the trailing direction from the effective cutting edges. Wedges 22 and 24 and the adjacent surfaces of the cutter body provide good chip pockets to insure proper chip flow with a relatively heavy cut. Spiral chips are formed and move radially from the cutting zone.

When this milling cutter has been in operation for sufficient time to dull the cutting edges, or if one of the cutting edges becomes damaged, the operation is stopped. Any number or all of the cutter inserts are then released individually and indexed to present new cutting edges. That is, this is accomplished by first loosening the screw 31, holding the block 24 which clamps a cutter insert having a dull or damaged edge, and the cutter insert is then indexed 90 degrees clockwise or counter-clockwise, and the screw is then tightened. This can be performed very quickly, and the inserts are always positioned very accurately. If an anvil seat becomes damaged, it may be replaced very quickly by removing its screw 26. Also, any dirt or foreign matter is cleared away easily. The recesses between surface 28 and lugs 34, 36 and 38 insures that dirt accumulation will not interfere with the proper seating and positioning of the cutter insert. When all of the cutting edges on a cutter insert have been used, it is replaced by an identical insert.

The adjustable blocks 16 are positioned accurately, e.g., by the use of a gauge and clamped in place. It has been pointed out above that the anvil seats 18 are all identical, and the clamping surfaces 28 and 30 are parallel. It is thus seen that each of the cutter inserts is received in a cavity or pocket which is identical with that for each of the other cutter inserts. Also, the cutter inserts are produced so as to be identical in every respect, and the grinding and finishing operations are performed in jigs or holders identical in function with the lug and clamping surface construction of the milling cutter.

In the illustrative embodiment, the cutter inserts are positive rake or positive angle cutters. That is, each of the cutting edges 27 is formed by an acute angular relationship between the insert surfaces. It is contemplated that the invention may be incorporated into negative angle cutters wherein the two surfaces forming the cutting edge are at right angles to each other. That is, each of the cutting edges is formed by a 90 degree angular relationship between a side face and an edge surface. With such inserts there are eight cutting edges rather than the four on the positive angle cutting inserts of FIGURES 1 to 5. With negative angle cutter inserts, the insert is indexed to the four cutting edges along one side face, and it is then turned face-to-face so that the other four cutting edges are presented. While the illustrative cutter inserts are square so as to present four cutting edges, the invention contemplates that cutter inserts of other shapes may be used while retaining certain advantages of the invention. The principle of supporting the cutter inserts by lugs and clamping surfaces as described above, insures the accurate positioning for each cutting edge.

Figure 6:
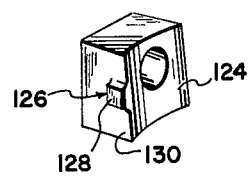
FIGURE 6 is a perspective view of a modified form of wedge for clamping the cutter inserts in place.

In FIGURE 6 a wedge 124 is shown which is used in place of wedge 24 of FIGURES 1 to 5. Wedge 124 has a lug 126 with a flat face or surface 128 which is displaced outwardly away from a surface 130. Surface 128 clamps the cutter insert against surface 28 of the anvil seat 18. Lug 126 is at the edge of the cutter insert remote from the axis of the milling cutter. With this arrangement, the insert is clamped tightly throughout the effective zone of cutting, and this avoids difficulties which might be encountered because of wide tolerances in the dimensions and angular relationships in the surfaces of the parts. For example, the angular tolerances between the side surfaces of groove 14, insert 20 and anvil seat 18 might be combined in such a way as to cause difficulties in securely clamping the insert, and the arrangement of FIGURE 6 avoids that possibility.

Figure 7:
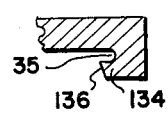
FIGURES 7 and 8 are sectional views similar to FIGURE 5, but showing other embodiments of the invention.
Figure 8:
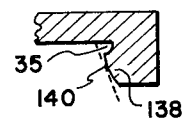

The invention contemplates that lugs 34, 36 and 38 may be segments of spheres, and in fact, that a hard steel or carbide sphere or part of one may be partially embedded in the contiguous walls. However, by referring to FIGURE 5 and the upper right hand portion of FIGURE 3, it will be seen that lugs 34 and 36 are not spherical segments but are of greater radius in the vertical plane of FIGURE 3 than in the transverse plane of FIGURE 5. Also (see FIGURES 3 and 4) lug 19 has a similar shape. These lugs are so shaped as to give the desired support to the cutter insert without interferring with the accurate positioning of the insert. In FIGURE 7, lug 134 has a flat surface 136 which is at an angle so that it is exactly parallel to the edge surface of the insert, and each of the other two lugs (not shown) has a similar flat surface. Hence, the edge surfaces of the insert rest flat against the the lug surfaces. In FIGURE 8 lug 138 is crowned in both directions and is also at an angle similar to surface 136. Surface 140 contacts the edge surface of the insert in a relatively small area, and the angular relationship insures that the insert surface is contacted near its center line. In each embodiment, the lugs are positioned from each other sufficiently to insure the proper support as discussed above.

Referring again to FIGURE 5, a groove 35 between lug 34 and surface 28 permits ready cleaning, and similar grooves are provided in the other embodiments. Cleaning may be accomplished by wiping or blowing. Three spaced edge surface supports are superior to a greater or a lesser number. Also, the feature of finishing the cutter inserts in jigs functionally identical with the milling cutter structure insures utmost accuracy.

The invention is not restricted to the above described embodiments, which are only examples of how the invention can be used within the scope of the following patent claims.

What is claimed is:

1. In a milling cutter, the combination of: a rotatable cutter body having a plurality of identical slots equally spaced around its periphery; and a plurality of cutter insert assemblies corresponding in number to the number of said slots with one of said assemblies positioned within each of said slots, each of said assemblies including an indexible cutter insert having parallel side faces which are regular polygons and having identical flat edge surfaces, said edge surfaces intersecting one of said side faces and forming identical cutting edges, each of said assemblies also including insert-positioning means and insert-clamping means, said insert-positioning means comprising support means and means holding said support means in a selected and fixed position upon said cutter body, said support means presenting three spaced support portions for the insert, two of said support portions being positioned to contact and provide support for one of said edge surfaces of the insert and the other of said support portions being positioned to contact and provide support for another of said edge surfaces of the insert in a direction which is substantially transverse to the direction of the support provided by said two of said support portions, said clamping means being formed by a pair of opposed clamping portions and presenting opposed clamping faces which clamp against said side faces of said insert, said two of said support portions presenting supporting surfaces which are effective along a plane which is transverse to one of said cutting edges of the cutter insert supported thereon and are integral with the structure presenting one of said opposed clamping faces and said other of said supporting portions comprising means separate therefrom.

2. In a milling cutter, the combination of: a rotatable cutter body having a plurality of identical slots equally spaced around its periphery; and a plurality of cutter insert assemblies corresponding in number to the number of said slots with one of said assemblies positioned within each of said slots, each of said assemblies including an indexible cutter insert having parallel side faces which are regular polygons and having identical flat edge surfaces, said edge surfaces intersecting one of said side faces and forming identical cutting edges, each of said assemblies also including insert-positioning means and insert-clamping means, said insert-positioning means comprising support means and means holding said support means in a selected and fixed position upon said cutter body, said support means presenting three spaced support portions for the insert, two of said support portions being positioned to contact and provide support for one of said edge surfaces of the insert and the other of said support portions being positioned to contact and provide support for another of said edge surfaces of the insert in a direction which is substantially transverse to the direction of the support provided by said two of said support portions, each of said spaced support portions having a convex contact surface whereby it provides substantially point support for the insert and said support means comprising one member with which said two of said support portions are integral and another member with which said other of said support portions is integral, said clamping means being formed by a pair of opposed clamping portions and presenting opposed clamping faces which clamp against said side faces of said insert.

3. In a milling cutter, a cutter insert assembly comprising, a cutter insert having parallel side faces and identical edge surface portions, each of said edge surface portions intersecting one of said side faces whereby identical cutting edges are formed and said insert may be indexed to change the effective cutting edge, said assembly also including insert-positioning means and insert-clamping means, said insert-positioning means comprising support means and attaching means holding said support means in a selected and fixed position upon said cutter body, said support means presenting three spaced support portions for said insert, two of said support portions being positioned with their supporting surfaces in alignment to contact and provide support for one of said edge surface portions of said insert whereby two spaced supports are provided which determine the position of the cutting edges in general alignment therewith and the other of said support portions being positioned so that its supporting surface contacts and provides support for another of said edge surface portions of said insert in a direction which is substantially transverse to the direction of the support provided by said two of said support portions, said support means comprising one member with which two of said support portions are integral and another member with which the other of said support portions is integral, said clamping means being formed by a pair of opposed clamping portions and presenting opposed clamping faces which clamp against said side faces of said insert.

4. In a milling cutter, a cutter insert assembly comprising, a cutter insert having parallel side faces and identical edge surface portions, each of said edge surface portions intersecting one of said side faces whereby identical cutting edges are formed and said insert may be indexed to change the effective cutting edge, said assembly also including insert-positioning means and insert-clamping means, said insert-positioning means comprising support means and attaching means holding said support means in a selected and fixed position upon said cutter body, said support means presenting three spaced support portions for said insert, two of said support portions being positioned with their supporting surfaces in alignment to contact and provide support for one of said edge surface portions of said insert whereby two spaced supports are provided which determine the position of the cutting edges in general alignment therewith and the other of said support portions being positioned so that its supporting surface contacts and provides support for another of said edge surface portions of said insert in a direction which is substantially transverse to the direction of the support provided by said two of said support portions, said support means comprising one member with which two of said support portions are integral, one of said support portions providing a rigid support for said insert in a transverse direction with respect to the edge surface which is positioned at the effective cutting edge and said attaching means being releasable to permit the adjustment of the position of the last-named support portion in said transverse direction, said clamping means being formed by a pair of opposed clamping portions and presenting opposed clamping faces which clamp against said side faces of said insert, said clamping means being releasable to permit the indexing or replacement of the insert while said spaced support portions are held rigidly in fixed position.

5. In a milling cutter, the combination of: a rotatable cutter body having a plurality of identical slots equally spaced around its periphery; and a plurality of cutter insert assemblies corresponding in number to the number of said slots with one of said assemblies positioned within each of said slots, each of said assemblies including an indexible cutter insert having parallel side faces which are regular polygons and having identical edge surfaces, said edge surfaces intersecting one of said side faces and forming identical cutting edges, each of said assemblies also including insert-positioning means and insert-clamping means, said insert-positioning means comprising support means and separate mechanical fastening means holding said support means in a selected and fixed position upon said cutter body, said support means presenting three spaced support portions for the insert, two of said support portions being positioned to contact and provide support for one of said edge surfaces of the insert and the other of said support portions being positioned to contact and provide support for another of said edge surfaces of the insert, one of said support portions providing a rigid support for said insert in a transverse direction with respect to the edge surface which is positioned at the effective cutting edge and said fastening means being releasable to permit the adjustment of the position of the last-named support portion in said transverse direction, said clamping means being formed by a pair of opposed clamping portions and presenting opposed clamping faces which clamp against said side faces of said insert, said clamping means being releasable to permit the indexing or replacement of the insert while said spaced support portions are held rigidly in fixed position.

References Cited by the Examiner
UNITED STATES PATENTS

| | | | |
|---|---|---|---|
| 2,264,299 | 12/1941 | Crosby | 29—105 |
| 2,584,449 | 2/1952 | Hoglund. | |
| 2,805,467 | 9/1957 | Greenleaf | 29—96 X |
| 2,903,871 | 8/1959 | Hudson | 29—96 |
| 2,982,008 | 5/1961 | Facknitz | 29—96 |
| 3,056,186 | 10/1962 | Greenleaf | 29—105 |
| 3,083,442 | 4/1963 | Almen | 29—105 |

FOREIGN PATENTS

| | | |
|---|---|---|
| 1,031,998 | 3/1953 | France. |
| 832,328 | 4/1960 | Great Britain. |

WILLIAM W. DYER, JR., *Primary Examiner.*